US007955462B2

(12) United States Patent
Tubbs

(10) Patent No.: US 7,955,462 B2
(45) Date of Patent: Jun. 7, 2011

(54) METHOD FOR ACCOMMODATING THE USE OF CHEMICALS THAT CONTAIN LOW AMOUNTS OF VOC IN AN EXISTING DEVICE WHERE CHEMICALS THAT CONTAINED HIGH LEVELS OF VOC HAD PREVIOUSLY BEEN USED AND RESULTANT PRODUCT

(76) Inventor: Robert Tubbs, Burbank, CA (US)

( * ) Notice: Subject to any disclaimer, the term of this patent is extended or adjusted under 35 U.S.C. 154(b) by 998 days.

(21) Appl. No.: 11/754,124

(22) Filed: May 25, 2007

(65) Prior Publication Data

US 2008/0290545 A1 Nov. 27, 2008

(51) Int. Cl.
*B29C 73/04* (2006.01)

(52) U.S. Cl. ............ 156/94; 156/98; 156/213; 427/140; 277/370; 277/421; 277/435; 277/511; 277/551; 277/609; 277/630

(58) Field of Classification Search .................... 156/86, 156/94, 98, 213; 427/140; 277/370, 421, 277/435, 511, 551, 609, 630
See application file for complete search history.

(56) References Cited

U.S. PATENT DOCUMENTS

| | | | |
|---|---|---|---|
| 5,344,573 | A | 9/1994 | Hill et al. |
| 5,603,263 | A | 2/1997 | DuFout et al. |
| 5,647,909 | A | 7/1997 | Damrau et al. |
| 5,734,944 | A | 3/1998 | Seeley et al. |
| 6,176,180 | B1 | 1/2001 | Taylor et al. |
| 6,775,925 | B2 | 8/2004 | Zagar et al. |
| 7,055,931 | B2 | 6/2006 | West et al. |

OTHER PUBLICATIONS

Printing Industries Association of Southern California, Weekly Newsletter, Feb. 26, 2007, SCAQMD News Section, published by Printing Industries Association of Southern California, Los Angeles, California.
Reducing VOC Solvent Use in the Printing Industries, Printing Industries Association of Australia, 1999, pp. 1-7.

*Primary Examiner* — Richard Crispino
*Assistant Examiner* — Christopher Schatz
(74) *Attorney, Agent, or Firm* — Law Office of Ken Dallara; Ken Dallara

(57) ABSTRACT

This method to allow the use of low VOC (volatile organic compounds) solvents in blanket cleaning operations and the resultant product that is produced by this method involves the retrofitting of currently existing seals on printing press so that operators can use low VOC solvents in place of high VOC solvents. High VOC solvents are harmful to the atmosphere and humans alike. As VOC are lighter than the surrounding air, humans are subjected to inhalation of these harmful vapors which cause respiratory and other health ailments. The VOC continue to rise, mixing with nitrogen oxides, until they reach the troposphere forming thick layers of ozone or smog. The current movement of municipalities to limit the use of high VOC solvents have lead printers and others to use low VOC solvents which are inherently less evaporative than high VOC solvents. This lack of evaporation causes problems with having to handle greater volumes of waste to handle and dispose properly. Catch pans and basins designed to work in high VOC applications are insufficiently engineered to handle this increased waste and seals that are sized to fit the catch pans and basins are designed to be permeable to allow for the evaporation of the VOC. This method creates an impermeable seal with similar sizing to retrofit the existing seal allowing the user to simply change the seal versus changing the entire catch pan.

6 Claims, 2 Drawing Sheets

METHOD FOR ACCOMMODATING THE USE OF CHEMICALS THAT CONTAIN LOW AMOUNTS OF VOC IN AN EXISTING DEVICE WHERE CHEMICALS THAT CONTAINED HIGH LEVELS OF VOC HAD PREVIOUSLY BEEN USED AND RESULTANT PRODUCT

BACKGROUND OF INVENTION

Volatile organic compounds (VOCs) are emitted as gases from certain solids or liquids. VOCs include a variety of chemicals, some of which may have short- and long-term adverse health effects. Evaporation of gasoline, solvents, oil-based paints, and hydrocarbons from the petrochemical industry are significant sources. One of the leading uses of chemicals that contain VOC's are products designed to dissolve or to alter the chemical or physical structure of objects. Household cleaning products to industrial solvents are examples of this kind of chemical.

The Federal government, though various agencies, sets standards for human interaction with airborne particles and chemicals. But many products are not regulated including many products used in the printing industry. Many chemicals compounds such as Formaldehyde, Methylene chloride, Benzene, which have known health risks, are found in many cleaning solutions as they exhibit the ability to break chemical bonds allowing for materials to be disassociated with those areas needing to be cleaned.

It is critical for the health of those people who need to be associated with, or in close proximity to, those compounds and chemicals that produce VOC, that those people are kept in well ventilated open spaces where the VOC can dissipate into the surrounding atmosphere.

It is unfortunate that as dangerous as VOC's for people, it is important to our atmosphere. Our Ozone is formed by the reaction of volatile organic compounds (VOCs) and nitrogen oxides (NOX) in the presence of sunlight and warm temperatures. Ozone is found at two levels of the atmosphere, the lower troposphere and the high stratosphere. It is the over-abundance of VOC causes too much ozone in the troposphere or photochemical (ground level ozone) or more commonly known as smog. This smog has many harmful effects upon the physical health of people, plants and animals. And because this smog is not always stagnant, the health problems to all concerned is spread over a large area. High level winds disperse this ozone and precipitation carries this ozone back down to earth in the form of acid rain. Unfortunately, there is no way to trade the over-abundance of ground-level ozone in the troposphere up to the stratosphere, to fill in the depleted ozone layer, the depleted ozone that everyone hears about.

Though automobiles are the largest source of VOC through the combustion of hydrocarbons in fossil fuels, cleaning solvents are a major contributor. Many municipalities are forging ahead with legislation ahead of the Federal government enforcing limits on VOC emissions and are mandating the use of low VOC solvents, paints and inks. Low VOC solvents are those that contain less than 650 grams per liter for use in automated cleaning systems. Industries Trade Groups such as Printing Industries Association (PIA) have stated that current regulation in Southern California will spread statewide and nationwide. In Southern California, the South Coast Air Quality Management District has implemented a plan of reducing the VOC limit to 100 grams per liter, far below the current limit of 650 grams per liter. PIA stated implementation will destroy the printing industry as company will not be able to use such ultra low VOC solvents in current equipment. This invention allows for the use of low and ultra low VOC solvents in current equipment.

In the past, as more solids are used to produce higher quality inks and dyes, stronger or more stringent solvents are needed to dissolve these solids from the printing blankets and associated hardware. In general using the current mode of processing, the stronger or more stringent the solvent is, the higher the amounts of chemical that cause VOC are present. The printing industry using high VOC solvents were not bothered by the amount of solvent used or sprayed, as the evaporation of these solvents into the air prevented many issues confronted when low VOC solvents are used. Printing inks and solvents with a high amount of chemicals containing VOCs dry more quickly, as VOC's evaporate into the surrounding atmosphere, allowing for faster printing times. Some companies that produce low VOC solvents calculate as much as a 25% greater drying time is associated with low VOC solvents as compared to high VOC solvents. Ultra low VOC solvents, those with approximately 100 or less grams per liter, will not evaporate under normal usage circumstances. As high VOC solvents evaporate into the surrounding atmosphere and off of the actual printed materials generated, catch basins, catch pans and storage bins were not engineered or designed to accommodate solvents that would now be present for a longer period of time with the use of low VOC solvents. Equipment was designed to allow for evaporative air flow to speed the evaporation process, using permeable seals and air gaps. Currently, water based inks and dyes are being developed and used that are approaching the equivalent quality of the high solid petroleum based inks. This allows for the use of low VOC solvents in the cleaning of equipment and blankets that are associated with the printing process.

It is especially a problem to use low VOC solvents in areas where there are tight tolerances between areas where the solvent is used and the actual printed material is located. Such an area is located at each stage of the 4 or more colors that are applied by printed or engraving rollers and printing cylinders in offset presses. These solvents are also used on single stage presses as well. This invention is designed to adapt to a variety of applications, though the best mode practiced here is in the printing presses industry. These cylinders rotate through as the printing media is feed past the cylinder in a syncopated manner. As part of each rotation of the cylinder, the printing plate is rotated through a series of various rollers that transfers liquids, paints, ink or dyes from their source eventually onto a printing blanket. There are devices that remove unused printing materials, dust, lint and various other impediments from the printing blanket prior to the application of more liquids, inks or dyes from the printing plate. It is imperative that the printing blanket is free of all foreign debris or "hickies". The device called a blanket washer contains a wetting portion where solvent is applied and a cleaning section which is configured with counter-rotating brushes. It is the function of the cleaning portion of the blanket washer to remove such sediment, impediments and used paints, inks or dyes from this blanket. The blanket washer uses solvents to dissolve or reduce the adhesion of the particles on the blanket whereby the cleaning portion's scraper, wiper or counter-rotating brush can removed the particles and remaining solvent from the blanket. Currently, solvents containing high amounts of chemical that contain VOCs are used in the process as the VOC quickly evaporate leaving very little residue or waste liquid. Removed particles and remaining solvent once removed from the blanket falls into catch pans. Currently design printing equipment has designed catch pans to be of such a size to hold an amount of debris and solvent based on the high VOC content solvents. The amount of solvent in the catch pan is greatly reduced should it have the opportunity to evaporate as with high VOC solvents. Since the solvents were evaporating, seals that surround the catch pans were not hermetically designed or even tightly fitted with an interference, so as to prevent seepage. In fact, ambient air was free to flow as that increases the evaporation rate. As can be seen in the drawings and explanation disclosed in the specification of this patent, there exist very tight spaces for the various equipment to exist therein and as such increasing the size of the catch pan is not an option. It is further complicated by the proximity of the printing material that is passing directly under the catch pans, so that any excess solvent that could emanate from the catch pans will fall directly upon and ruin the printing media being transported through the printing press. Currently used permeable brush seals allow for seepage of this affluent out of the catch pans and onto the passing media but due to the high VOC content, the seepage quickly evaporates or never seeps out of the catch pan at all due to it's evaporation.

There are many instances of patented prior art that disclose the use of low VOC solvents and their advantages but fail to rationalize the problems associated with current equipment designed to take advantage of the evaporative properties of high VOC materials. U.S. Pat. No. 6,569,260 issued to Rhodes on May 27, 2003, is typical of prior art disclosing the formulation of low VOC solvents, which describes the use of a water based formulation as a solvent to remove ink in printing operations. Unfortunately, Rhodes does not accommodate for the collection of these excess solvents disposed into catch pans due to a lack of evaporative characteristics. These are some of the issues that are limiting the conversion of high VOC processes to ones using low VOC chemicals.

It is an object of this invention to create a method that will enable currently designed printing equipment to use low VOC solvents in the printing process to clean various pieces of printing equipment while using currently used collection devices without the opportunity for the escapement of the low VOC solvents from their disposal areas.

It is a further object of this invention to create a method whereby currently used brush sealing devices that are used to create a seal that can be adapted to function in currently designed or new printing equipment using low or ultra low VOC solvents.

It is a still further object of this invention to allow printing press operators to be able to convert to low VOC solvents and maintain their existing equipment without the fear of solvents damaging the very printing media being created in their current printing process due to now improperly engineered catch pans and brush seals.

It is yet another object of this invention to allow printing press owners to conform to the changing law, codes and regulations that are promulgating the use low VOC solvents which benefits the global environment.

In accordance with the objects of this invention and for the benefits and advantages aforementioned, the drawings, detailed description of said invention and claims will describe this invention.

BRIEF DESCRIPTION OF THE DRAWINGS OF THE INVENTION

The following drawings are used to identify and describe this invention in terms of it's use with one style of blanket washing system. The invention is shown here in reference to the this style of blanket washer, but is not limited to this style of solvent application, as this invention can be used in any application where semi-permeable brush style seals are used in the presence of high VOC solvents.

DETAILED DESCRIPTION OF THE DRAWINGS

This invention can be used to create a non-permeable seal from a semi-permeable seal while maintaining the essential shape, size, dimension and contouring characteristics of the original seal. The best mode for practicing this invention is in the field of printing presses where due to regulatory changes in solvent compositions, non-permeable seals are required where previously permeable seals were used. Due to the expense of modify printing equipment, a retrofit of currently used seals are the most economical and viable methods of complying with the new regulations. This use as herein described does not limit the application of this process from being applied to other equipment and devices.

Figure 1:
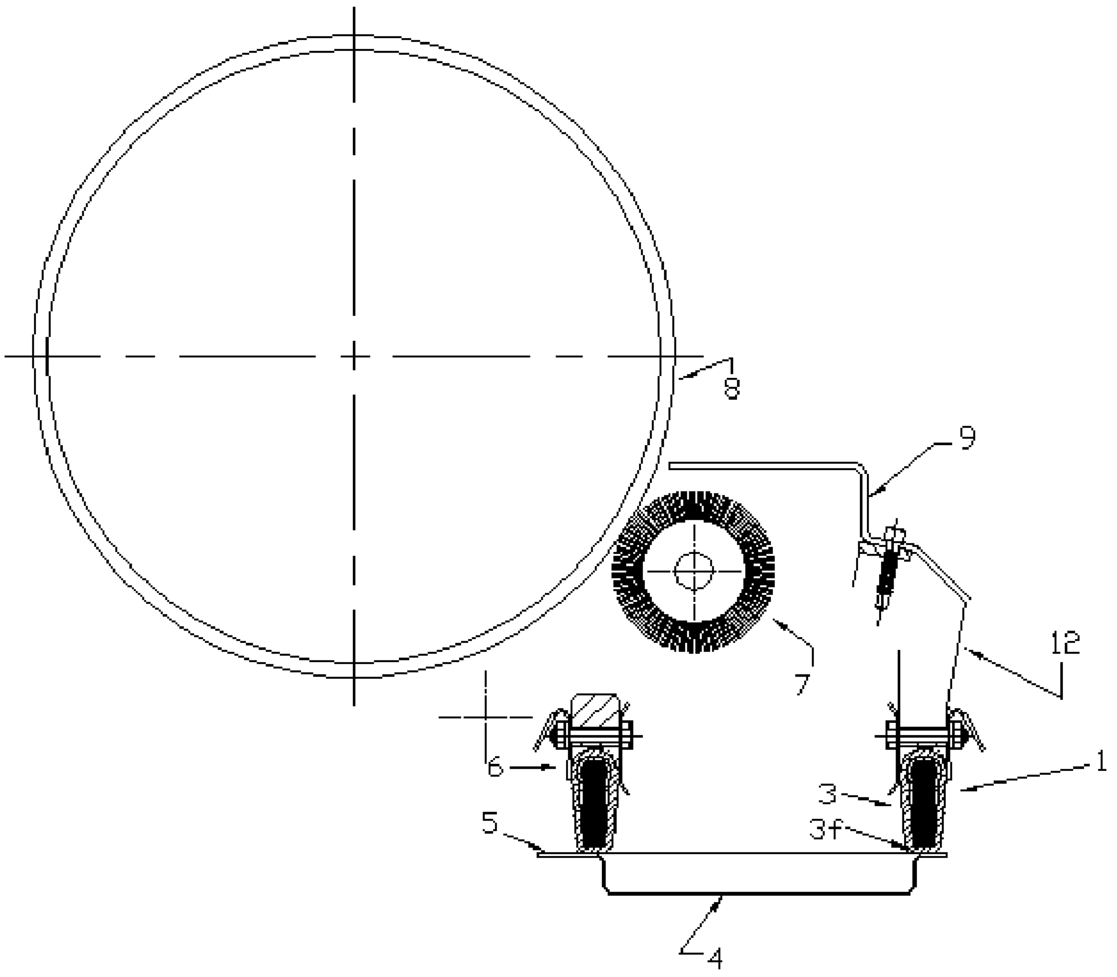
FIG. 1 is a cross sectional view of the invention as applied to a catch pan seal.

FIG. 1 is a typical application of the process in creating non-permeable seals where semi-permeable seals are replaced using existing seal retention devices and sealing surfaces without creating any new interferences. The non-permeable seal created by this inventive process herein described 1 has been relocated back into seal holder 6. Encapsulation material **3*f* is in an interference fit against sealing surface 5, whereby material 3*f* has been compressed and has conformed to the surface 5. In this application, solvent brush 7 which is laden with a low or non VOC solvent and is in proximal contact with printing cylinder 8. Brush 7 rotates counter to the rotation of cylinder 8 allowing for the cleaning of the cylinder 8 as it rotates through the location of tangential contact with brush 7. Debris, commonly referred to as hickey, and other unwanted pieces of materials, inks and paper residue are forcibly removed causing debris to be propelled against shield 12 and guard 9. This debris, heavily laden with solvent and excess solvent that has been removed from brush 7 vis-à-vis the centripetal force caused by the rotation of brush 7, eventually falls into the catch pan 4. Spatter as a result of the impact of the debris and excess solvent against shield 12 and guard 9 showers the semi-permeable seal 2 and drips down along guard 9 and shield 12. During the use of high VOC solvents, this spatter would have been evaporated quickly, even prior to the spatter reaching pan 4. With the use of low or non VOC solvents the semi-permeable seals are not able to create a seal tight enough to prevent the seepage of debris and excess solvent from the catch pan onto other pieces of equipment or onto the actual printed media. In this example, brush seals are used to create a semi-permeable seal 2. Existing semi-permeable brush seals are super saturated with this excess fluid to the point where seepage of this solvent is a natural occurrence due to the inability of brush seals to create a non-permeable barrier. FIG. 1 show the contact between the improved seal 3 by the inventive process herein described and the sealing surface 5 whereby seepage is prevented due to the ability now to create a tighter interference fit between improved seal 3 and surface 5 while maintaining existing seal holding hardware 6**.

Figure 2:
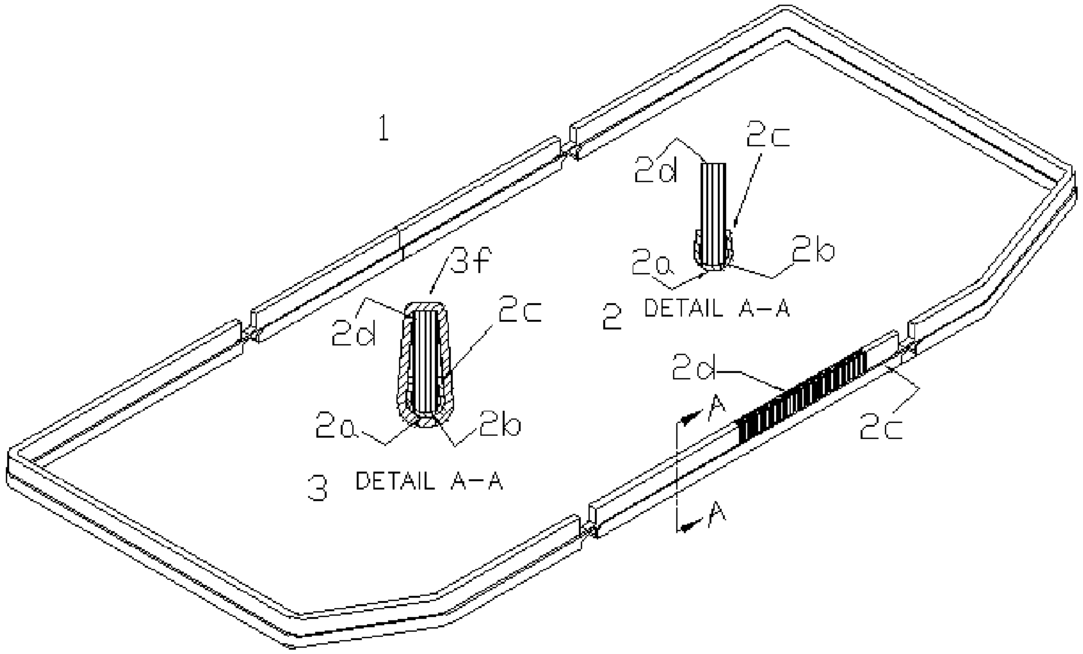
FIG. 2 shows the cross-section of the seal prior to and after the encapsulation of the seal using the described process. Layout of seal surrounding the detailed cross-sectional views is present as reference and not a limitation of the size, shape or structure of the seal.

FIG. 2 detail cross-sectional views of the seal prior to encapsulation as semi-permeable seal 2 and after encapsulation as improved seal 3. Seal cover material **3*f*, in this best mode interpretation of practicing this invention, is an elastomeric thermoset material which is partially polymerized and is preferably cross-linked or amorphous. This material is capable of contracting in the presence of heat and will re-set permanently in the contracted state. Cross-linking allows for the contraction to be similar in all three dimensions of the material and the fact that the material is partial polymerized or one with a low degree of polymerization allows for the bonds to be more easily reconfigured in the presence of heat. In this invention, seal cover material 3***f* is a thin tube made of a thermoset material, preferably cross-linked, such as polyolefin, fluoropolymer, PVC, neoprene, or silicon elastomer which shrinks in diameter when heated. Seal cover material 3*f* used must be thin enough not to impinge upon the relocation of the seal back into the original seal holder and must be strong enough to resist scuffing or abrasion by the seal holder upon re-installation of the seal into the seal holder. Original semi-permeable seal 2 had a metal clip 2*a* into which the proximal end of brush 2*b* was inserted therein and side 2*c* of clip 2*a* is crimped securing the brush end 2*b* to be securely confined therein. Distal brush end 2*d* is placed in contact with sealing surface 5 and creates a semi-permeable seal. Improved seal 3, which incorporates the inventive process herein described is created by placing a tubular section of seal cover material 3*f* over semi-permeable seal 2 where metal clip 2*a* forms one of the apexes of the seal and distal brush end 2*d* forms the opposite apex. Heat is applied to the cover 3*f* allowing the cover material to reach a temperature where polymerization of the material occurs. In this application, a simple heat gun was used though other methods are suitable so long as the heat source can be quickly disengaged and removed prior to damaging the cover material. Due to the partial polymerization of the material in it's original state, the cover material 3*f* will quickly contract forming a skin over the semi-permeable seal 2. Cover 3*f* is shown after the application of heat, whereby cover 3*f* has completely encapsulated semi-permeable seal 2 while maintaining the physical dimensional characteristics of seal 2 thereby allowing seal 2 to be replaced into the same hardware 6.

Though this application of the inventive process is used in the printing industry using materials that are chemically inert for this environment, it is not outside the scope of this application to have this inventive process used in other industries, machines, equipment or devices where the user requires the replacement of semi-permeable seals with a non-permeable seal while maintaining same fixtures and holding hardware.

What is claimed is:

1. A method for modifying semi-permeable brush seals for use with low volatile organic compound solvents in printing press equipment that previously used high volatile organic compound solvents comprising the steps of;

removing said semi-permeable seal from a seal holder, said seal holder within printing press equipment;

encapsulating exterior surface of said semi-permeable seal with a partially-polymerized elastomeric thermoset material capable of permanent contraction under a single application of heat;

applying heat from a heat source to said thermoset material causing said contraction;

applying said heat for a duration of time until said material has conformed to said exterior surface of said semi-permeable seal to form an encapsulated semi-permeable seal; and replacing said encapsulated semi-permeable seal into said seal holder.

2. A method as recited in claim 1 wherein said partially-polymerized elastomeric thermoset material is constructed of polymers incapable of chemically decomposing or decoupling in the presence of solvents with low volatile organic compounds.

3. A method as recited in claim 1 wherein said heat source is capable of producing heat greater than the polymerization temperature of said thermoset material and less than the melting temperature of said thermoset material.

4. A method as recited in claim 1 wherein said encapsulation is accomplished by inserting said semi-permeable seal into a tubular section of said partially-polymerized elastomeric thermoset material capable of permanent contraction under a single application of heat, said tubular section having an interior and exterior wall and said tubular section having openings at each termination end.

5. A method as recited in claim 4 wherein a length of said tubular section is greater than a length of said semi-permeable seal.

6. A method as recited in claim 5 wherein where pressure is applied to said termination ends of said tubular section immediately after application of said heat, said pressure being sufficient to permanently bond interior walls at each termination end to each other with available heat.

* * * * *